United States Patent [19]

Yokoyama et al.

[11] Patent Number: 5,370,836
[45] Date of Patent: Dec. 6, 1994

[54] PROCESS OF MAKING POROUS FLUOROPLASTICS MEMBRANE FOR AN AIR DEPOLARIZED BATTERY

[75] Inventors: Takashi Yokoyama, Osaka; Hajime Konishi, Ikoma; Naoko Souma, Katano, all of Japan

[73] Assignee: Matsushita Electric Industrial Co., Ltd., Osaka, Japan

[21] Appl. No.: 956,630

[22] Filed: Oct. 5, 1992

[30] Foreign Application Priority Data

Apr. 22, 1992 [JP] Japan .................................. 4-102611

[51] Int. Cl.$^5$ .............................................. B29C 67/20
[52] U.S. Cl. .................................................. 264/320
[58] Field of Search ................. 264/319, 320, 322, 325

[56] References Cited

FOREIGN PATENT DOCUMENTS 63-239783 10/1988 Japan .
3-210762 9/1991 Japan .

OTHER PUBLICATIONS

Translation of Japan 3-210,762 (Published Sep. 1991).
Abstract of Japan 59-58,758 (Published Apr. 4, 1984).

*Primary Examiner*—Leo B. Tentoni
*Attorney, Agent, or Firm*—Ratner & Prestia

[57] ABSTRACT

There is provided a method of making uniform porous fluoroplastic membranes having a high Gurley number and a narrow permeability range, this method comprising closing the pores on part of the surface of a fluoroplastic film by compression or by application of an ink. Also provided is a button type air depolarized battery having stable, long-term discharge characteristics over a wide range of load, by employing therein the foregoing porous fluoroplastic membrane having a high Gurley number. The battery structure is similar to that of a conventional battery, but is equipped with the foregoing improved fluoroplastic membrane.

3 Claims, 2 Drawing Sheets

PROCESS OF MAKING POROUS FLUOROPLASTICS MEMBRANE FOR AN AIR DEPOLARIZED BATTERY

BACKGROUND OF THE INVENTION

1. Field of the Invention

This invention relates to a button type air depolarized battery provided with a porous fluoroplastics membrane having low air permeability adjacent to the air hole and to a method of making such porous fluoroplastic membrane having low permeability.

2. Prior Art

Air depolarized batteries, which use oxygen in the air as the positive active material and zinc as the negative active material, is enjoying extended use due to reduced environmental pollution when discarded.

In FIG. 1, the general construction of a button type air depolarized battery is shown. As shown, zinc 1 is contained in a negative electrode case 2, which is closed by a positive electrode case 4 with gasket 3 in between. A separator 5 separates an air depolarized electrode 6 and zinc negative electrode 1. The air depolarized electrode 6 is in contact with a porous fluoroplastic membrane 7, which is layed inside the positive electrode case 4 having an air hole 8, with a diffusion paper 9 between membrane 7 and positive electrode case 4. Air hole 8 is closed with a sealing paper 10, which is to be removed before usage.

The function of the porous fluoroplastic membrane 7 is to control the supply of oxygen containing air to the inside of the battery, and to prevent the leakage of the electrolyte.

The button type air depolarized battery has the air holes 8 closed by sealing paper 10. When the sealing paper is torn off, the air holes are open and air is supplied through them to electrode 6, thus allowing the battery elements to react and produce an electromotive force.

As the method of manufacturing porous fluoroplastic membrane, the following two methods were known so far:

Conventional method No. 1

This method consists of the following three processes:

(1) a process of mixing fine powder of polytetrafluoroethylene with filler to form into film.
(2) a process of removing the filler to produce pores.
(3) a process of stretching to control the permeability.

For making a film of high Gurley number (i.e. with lower permeability) by the above method, it is known to decrease the filler to reduce the pore size. However, due to too little filler, the distribution of pores is apt to become uneven, and, accordingly, the range of distribution of air permeability, as measured by the Gurley number is wider. Therefore, the upper limit of Gurley number, which is inversely proportional to permeability, obtained stably by this method was a Gurley number of about 5000 s (seconds) by Gurley densometer provided in Japan Industrial Standard JIS P 8117 'Testing Method for Air Permeability of Paper and Paperboard'. JIS P 8117 is a Standard similar to ASTM D 726 'Standard Test Method for Resistance of Noporous Paper to Passage of Air'. It is based on Standard TAPPI T460 'Air Resistance of Paper' established by the Technical Association of Pulp and Paper Industry in the United States of America.

Using the above-mentioned Gurley densometer, air permeability is expressed by the seconds (abbreviated as "s") in which 100 ml air goes through. Generally this numerical value is referred to as the Gurley number.

Conventional method No. 2

Another method, which is disclosed, for example, in Japanese Patent Laid-Open No. Hei 3-210762 consists of pressing the whole surface of the porous fluoroplastic film prepared by the above three step process by passing the film between two cylinder rollers, to reduce the size of pores of the film and, accordingly, its permeability. For making a high-Gurley-number film by this method, increasing the compression ratio by the roller is used to reduce the pore size. However, due to excessive compression, some pores were often destroyed and a partly non-porous film with non-uniform permeability resulted. Hence, the stable limit of air permeability of the membrane manufactured by this method was a Gurley number of about 15,000 seconds.

SUMMARY OF THE INVENTION

The conventional battery, when the sealing paper is torn off, has its inside and outside connected through the air hole. And, due to deteriorating effect caused by external factors, such as release of moisture in the battery, or absorption of $CO_2$ from the air, over the long time of discharging, satisfactory sufficient performance is lost.

To remedy this shortcoming, investigation was made, in the past, intending to decrease the permeability, as far as possible, while keeping the inflow of oxygen sufficient for discharge.

It has been known by calculation of the necessary oxygen, for the button type air depolarized battery, that the permeability of the porous fluoroplastic membrane should to be below a Gurley No. of about 55000 s, using the method of JIS P 8117.

When manufacturing a membrane of Gurley number below 55000 s, the central value is to be set lower, in view of variation of the value in processing. This causes a reduction of discharge performance, due to absorption of $CO_2$ from, or evaporation of $H_2O$ to the environment. If the variation is small, the central value can be set at a higher Gurley number, and, with less effect from the environment, sufficient performance is attained. Thus, it has been attempted to manufacture, setting the central value at 50000 s and the distribution at from 45000 to 55000 s, without success due to high Gurley number variation in processing.

The present invention provides a remedy to such problems. It's first object is to provide an improved method of manufacturing a porous fluoroplastic membrane which method provides improved flouroplastic membrane having a high Gurley number and small variation in permeability. The second object is to provide a button type air depolarized battery, fitted with an improved porous fluoroplastic membrane, having long term, stable discharge characteristics.

To accomplish these objectives, the present invention provides an improved membrane obtained by partially compressing the pores of a porous fluoroplastic membrane or by partially closing the pores of such porous membrane by applying a coating of light-setting resin.

With these structures and method, a porous fluoroplastic membrane of high Gurley number and narrow variation of permeability is manufactured, and stable oxygen supply and prevention of penetration of $CO_2$ from the atmosphere, or of evaporation of $H_2O$ to the atmosphere, are accomplished. As a result, a button type air depolarized battery with stable discharging performance over wide range of load is obtained.

DETAILED DESCRIPTION OF THE INVENTION

Figure 1:
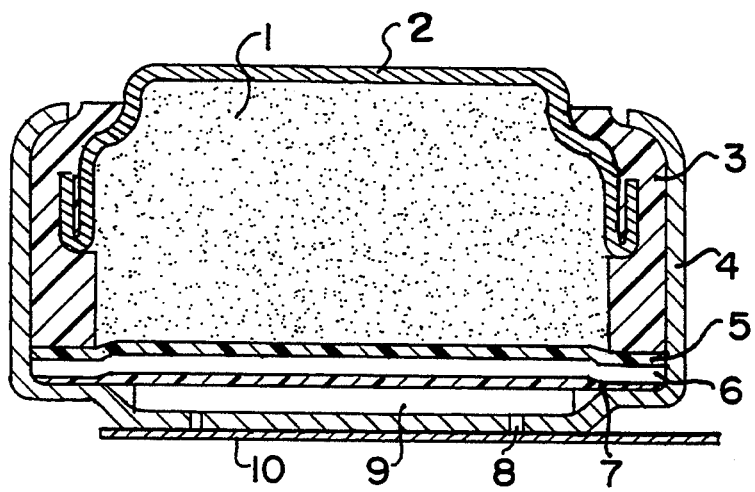
FIG. 1 is a cross section showing the structure of a conventional, prior art air depolarized battery.

Now, referring to the drawings, an embodiment of the present invention is explained below.

The button type air depolarized battery of this embodiment of the invention is of a similar structure to that of the conventional one shown in FIG. 1, but, with the difference that the porous fluoroplastic membrane thereof has been partially compressed or partially coated with W-setting ink to close the pores partially in accordance with the present invention.

Porous films of four types were manufactured, two comparison films and two films illustrating embodiments of the invention, as follows.

Comparison 1

A porous membrane produced by the conventional method No. 1 described above with average Gurley number 50000 s.

Comparison 2

A porous membrane produced by the conventional method No. 2 described above, in which the whole surface, having and initial Gurley number of 4000 s was compressed by a roller to have Gurley number of 50,000 s as a mean value.

Embodiment 1

A porous membrane with a Gurley number of 50,000 s as a mean value, obtained by partially compressing a porous fluoroplastic film having a Gurley number of 4000 s.

Embodiment 2

Figure 2A:
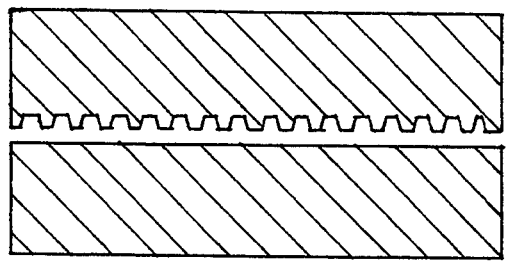
FIG. 2(a) is a cross section of a roller having small projections for partially compressing the porous fluoroplastic membrane according to the present invention.
Figure 2B:
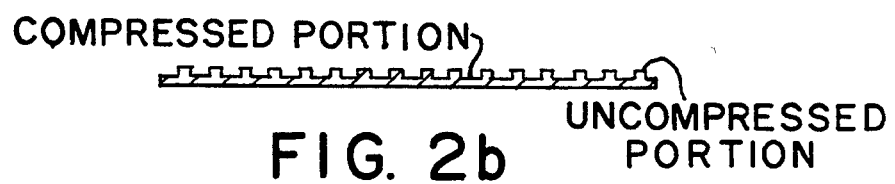
FIG. 2 (b) is a cross section of the porous fluoroplastic membrane thus partially compressed.

A porous film having an initial Gurley number of 500 to 5000 s, on 70 to 90% of the outer surface of which printing ink has been applied to close the pores and provide a porous membrane of Gurley number of about 50,000 s. The partial compression applied in Embodiment 1 was made by a roller with projections shown in FIG. 2(a) to form stripes as shown in FIG. 2(b).

The Gurley numbers of the porous fluoroplastic membranes thus prepared were measured and the distributions of permeability were examined using the above described Gurley densometer and testing method. The results are given in the following table:

| | Gurley number (seconds) min.-max. | Range |
|---|---|---|
| Comparison 1 | 8294–106240 s | 97946 s |
| Comparison 2 | 23354–68499 s | 45145 s |
| Embodiment 1 | 45320–55330 s | 10010 s |
| Embodiment 2 | 45400–55070 s | 10270 s |

As is clear from the above table, the porous fluoroplastic membranes of Embodiments 1 and 2 have narrow distribution ranges of permeability compared with the values of Comparison membranes 1 and 2. The maximum and minimum values are the largest and the smallest values of 50 samples.

Next, air depolarized batteries of the PR 2330 type were prepared using each of the above membranes and 10 pieces of each were examined for discharge characteristics.

Figure 3:
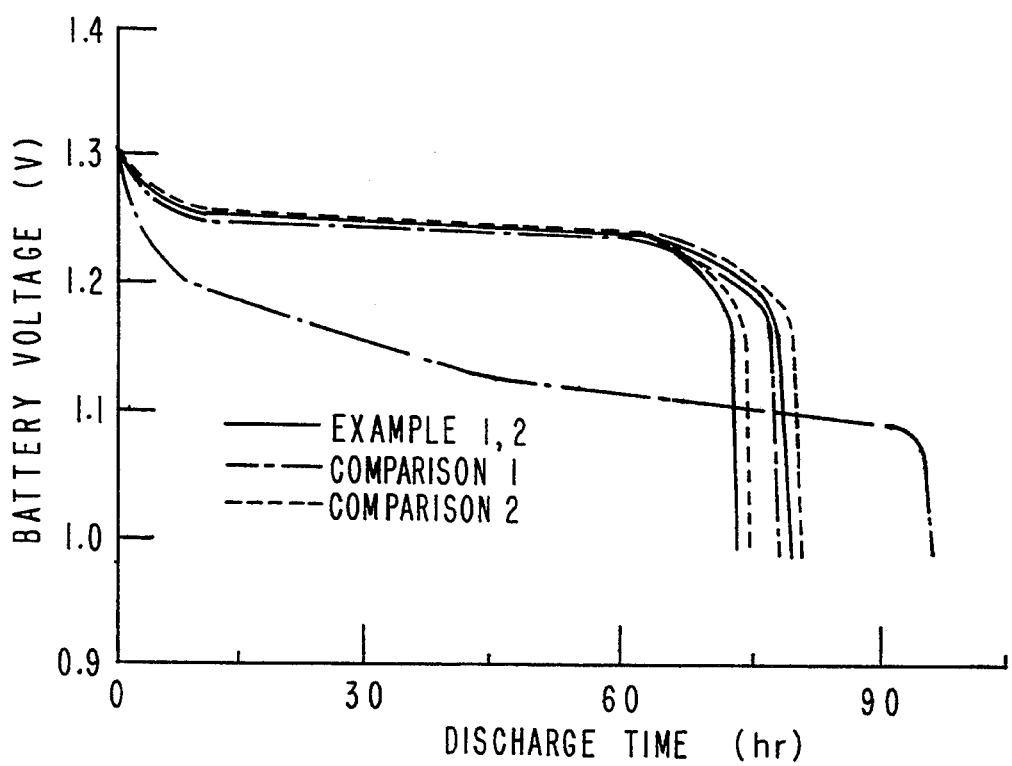
FIG. 3 is a diagram showing the high-rate discharging curve of an air depolarized battery with the porous fluoroplastic membrane of the present invention.
Figure 4:
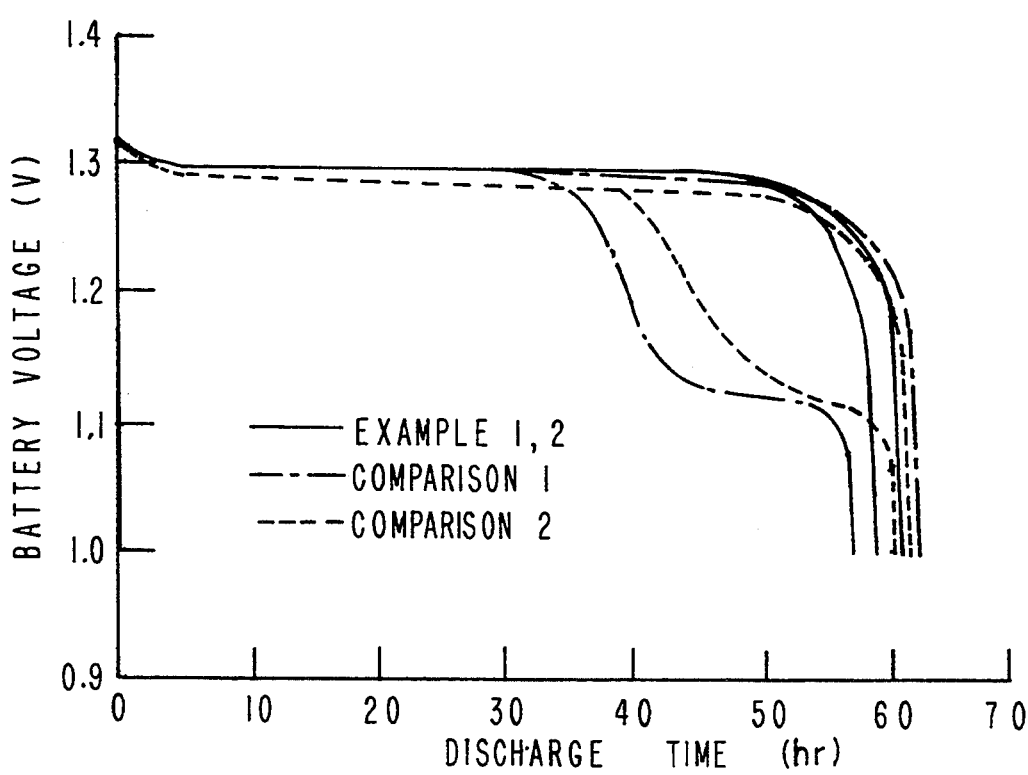
FIG. 4 is a diagram showing the low-rate discharging curve of the air depolarized battery with the porous fluoroplastic membrane of the present invention.

The results are shown in FIG. 3 and FIG. 4. The experimentally made batteries of the PR 2330 type have a 23.1 mm diameter, 3.0 mm height, 1.4 V nominal voltage, and 700 mAh nominal capacity.

FIG. 3 shows curves of discharge time (in hours) of these batteries under 125 $\Omega$ load, and at 23° C., 60% R.H. It is observed in FIG. 3 that, for Comparison battery 1, the discharge voltage drops early due to the shortage of oxygen or of permeability.

FIG. 4 shows discharge curves similar to those of FIG. 3, but when the batteries are under 3.0 k$\Omega$ load, also at 23° C., n=5 and 60% R.H. It is observed that, for Comparison battery 1, the voltage drops in the middle of the discharging process. This is the result of a large effect of the environment due to the permeability of the membrane being too high. For Comparison battery 2, an early voltage drop, though not as great as for Comparison battery 1, but due to the same cause, is also observed, and some widening of distribution is seen.

Thus, it is learned that, according to the first embodiment of the present invention, by compressing part of the area of a porous fluoroplastic film of low Gurley number, a stable membrane of high Gurley number of narrow distribution is obtained, resulting in stable discharge performance over a load range from small to large, or of 3.0 k$\Omega$ to 125 $\Omega$.

In passing, instead of the porous fluoroplastic film of Gurley number 4000 s, having part of its area compressed, of the above first embodiment, starting with films of Gurley number 500 to 5000 s, and applying printing ink to close 70 to 90% of the pores, in accordance with Embodiment 2 above, the same effects were attained.

Instead of partially compressing in stripe form as in the above Embodiment 1, compressing partially in other form such as dotted form was found to give the same effect. As for the area to be compressed, which was a little over 90% of the whole membrane in the example, if it is more than 95%, deleterious effects on the battery performance is a danger due to insufficient diffusion of oxygen. On the other hand, if less than 70% of the membrane is compressed, a membrane of fairly high Gurley number is necessary as the starting material. Therefore, compressing part of an area in the range of 70 to 95% is preferable.

Further, instead of the compression method used in the above Embodiment 1 to partially close the pores of the porous fluoroplastic film, similar effect was attained by a method of printing on 70 to 95% of the outer surface of a porous fluoroplastic film of 500 to 5000 seconds Gurley number as in the above EMbodiment 2. As the method of printing, use was made of a printer with a UV ink consisting mainly of rapidly curing urethane resin or silicon resin of the UV light-setting type.

Also, instead of the polytetrafluoroethylene resin used in the above embodiment, other fluoroplastic resin films can be substituted with the same effect.

As is clear from the above explanation of the embodiments, according to the present invention, by closing some of the pores of a porous fluoroplastic film of relatively low Gurley numbers, there is obtained a membrane of desired higher Gurley number with a small distribution range. With the use of this membrane, a button type air depolarized battery having stable characteristics over a wide range of load is obtained.

What is claimed is:

1. A method of manufacturing a porous fluoroplastic membrane which comprises compressing part of the area of a porous fluoroplastic film, having a Gurley number of 500 to 5000 seconds, when tested according to JIS P 8117, to thereby obtain a membrane having a Gurley number of 45000 to 50000 seconds.

2. A method of manufacturing a porous fluoroplastic membrane according to claim 1, wherein the compressing covers 70 to 90% of the surface area of the membrane.

3. A method of manufacturing a porous fluoroplastic membrane according to claim 1, or 2, wherein the porous fluoroplastic film comprises polytetrafluoroethylene resin.

* * * * *